April 23, 1940.   B. J. WESSELINK   2,198,445
DEVICE FOR VISUALLY INDICATING THE DEVIATION FROM A COURSE
Filed March 27, 1937   2 Sheets-Sheet 2
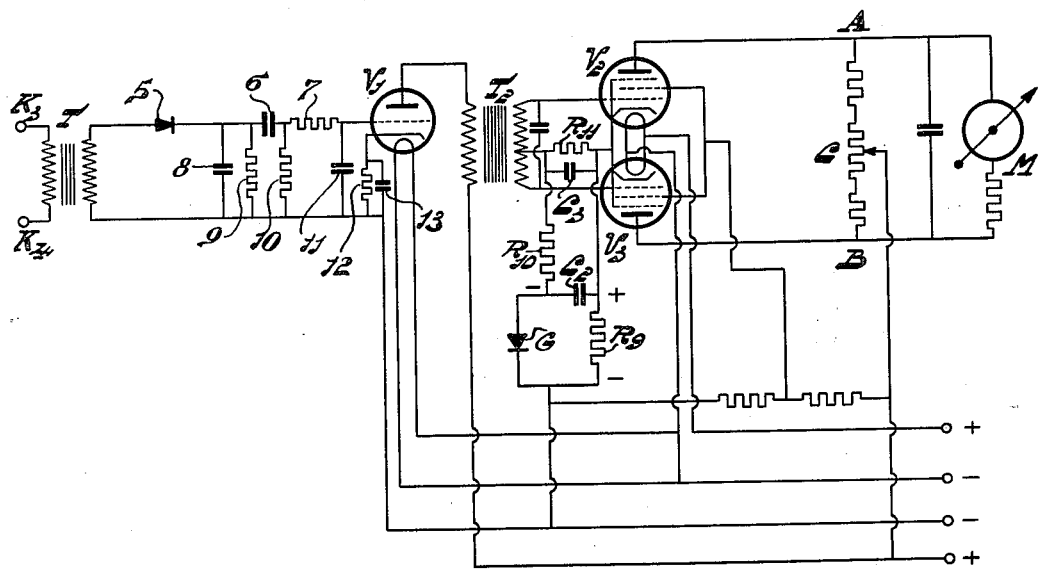
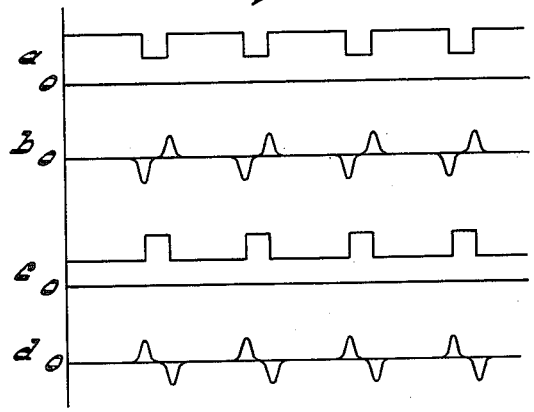
INVENTOR
BALTHAZAR J. WESSELINK
BY
ATTORNEY Patented Apr. 23, 1940

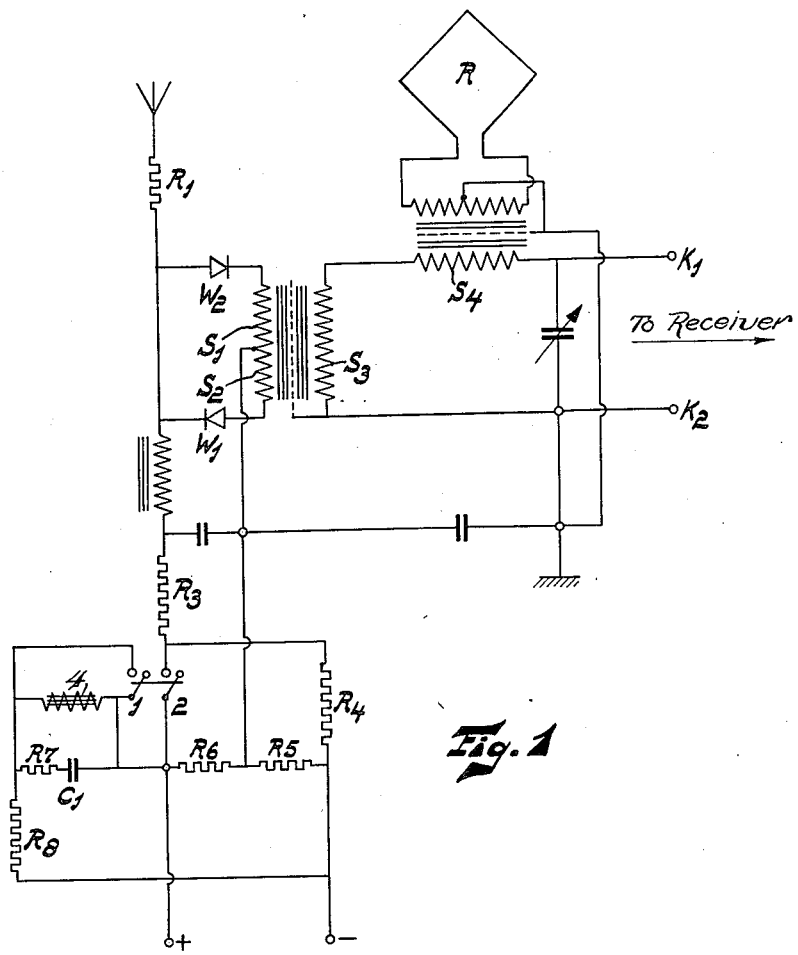

2,198,445

UNITED STATES PATENT OFFICE 2,198,445

DEVICE FOR VISUALLY INDICATING THE DEVIATION FROM A COURSE

Balthazar Jan Wesselink, Hilversum, Netherlands, assignor, by mesne assignments, to Radio Corporation of America, New York, N. Y., a corporation of Delaware Application March 27, 1937, Serial No. 133,438
In the Netherlands May 14, 1936

4 Claims. (Cl. 250—11)

In a homing device which may be aimed at a radio beacon or at another radio transmitter utilised as such, it is desirable to be enabled to perceive any deviation from the course not only by the ear but also or even exclusively by the eye.

The object of the invention is to provide a device with the aid of which this may be achieved in a better manner than has hitherto been possible.

The emission of the usual beacons is such that in the course line a continuous tone is heard which is sub-divided on the one side of this line into dashes and on the other side into dots. In accordance therewith a reading device sensitive to these audio-frequency currents is constructed in such manner that in the course line a pointer remains in the zero position and reacts to dashes with a deflection in the one direction and to dots with a deflection in opposite direction.

The invention first provides an improved and appropriate construction of the reading instrument.

If the vehicle is headed towards a transmitter whose field strength does not vary periodically, as with the beacons above referred to, the vehicle itself must be provided with a device for causing the direction characteristic of its aerial system to vary periodically.

The invention provides an improved device for attaining this purpose.

This device, which when being headed for a beacon is switched in and out of circuit, operates in such manner that the signals received from the transmitter arrive at the reading device in the form of audio-frequency currents divided into dots or dashes as if they came from a beacon.

According to the invention, these audio-frequency currents, which consequently may originate from a beacon as well as from any other transmitter, are supplied, after being transformed into impulse combinations with different initial signs for dashes and dots respectively, to the control grids of two push-pull tubes the common anode circuit of which has an arrangement such that as soon as a current impulse is produced in one of the tubes, both tubes are cut-off owing to a sudden increase of the negative grid bias, which cutting-off gradually disappears again in the lapse of time between two impulses.

According to the invention, use may be made for this purpose of a resistance which is located in said common anode circuit and which is shunted by a condenser in series with a rectifier, said condenser having across its terminals a leakage resistance which forms at the same time part of the grid circuits of both push-pull tubes.

Only part of this leakage resistance should preferably be included in said grid circuits, said part being shunted by a further condenser.

For causing the direction characteristic of the receiving aerial to vary periodically, use is made in known manner of a frame and of a non-directional aerial while the signal which is received by one of them is periodically reversed in phase.

According to the invention, this is effected with the aid of rectifiers which are connected in parallel so as to pass current in opposite senses and which are alternately made operative by means of an auxiliary voltage which is suited to be changed-over.

The change-over of this auxiliary voltage may be effected in this case with the aid of a relay which is given different energising and de-energising times by means of a condenser which is charged through a high resistance until the armature is attracted and which then may be discharged via a smaller resistance.

The invention will be explained more fully with reference to the accompanying drawings which represent, by way of example, one embodiment thereof.

Figure 1 represents an aerial system adapted to receive a radiated wave having a constant direction characteristic.

Figure 2 represents diagrammatically a device for visual indication adapted to be connected to the receiving apparatus.

Figure 3 shows diagrams of impulse combinations.

The aerial system represented in Figure 1 consists of a non-directional aerial and of a frame R. Into the non-directional aerial is connected a high resistance $R_1$. This aerial is connected via two rectifiers $W_1$ and $W_2$ connected in opposite senses, to both ends of coils $S_1$ and $S_2$ which are connected in series while the junction point of these coils is connected to earth and also to the junction point of two resistances $R_5$ and $R_6$ whose free ends are connected to the terminals of a battery. The free end of $R_6$ is connected not only to one of the terminals of the battery but also, via a switch 2, a resistance $R_3$ and a choke coil, to the lower end of the aerial whereas the free end of $R_5$ is connected via a resistance $R_4$ to the lower end of the resistance $R_3$. The result is that, so long as the switch 2 is open, current will flow from said battery through $R_6$, $S_2$, $W_1$, $R_3$ and $R_4$ back to the battery, whereas when the switch 2 is closed the current flows from the positive terminal of the battery via 2, $R_3$, $W_2$, $S_1$ and $R_5$ back to the battery.

By virtue of this circuit-arrangement the two rectifiers $W_1$ and $W_2$, which are assumed to be of the dry type, are alternately non-conductive or are adjusted to work on a steep slope of their characteristic curve so that, in dependence on the switch 2 being opened or closed, aerial current will flow through $S_1$ or through $S_2$. The result in the secondary winding $S_3$ of the transformer of which $S_1$, $S_2$ is the primary winding will consequently be that the phase thereof is reversed owing to the switch 2 being opened and closed.

The secondary winding $S_3$ is connected in series with the secondary winding $S_4$ of a second transformer whose primary winding is connected between the ends of the frame R. The combined energy collected by both aerials is consequently supplied to two contacts $K_1$ and $K_2$ to which the receiving apparatus which is not shown may be connected.

The above described change-over device may also be provided in combination with the frame aerial although from a constructional point of view this is less simple.

A resistance $R_1$ included in the non-directional aerial serves in known manner to compensate the phase difference of 90° between the two aerials.

The momentarily non-conductive rectifier $W_1$ or $W_2$ exclusively represents a capacity of certain value whereas the conductive rectifier in parallel with this capacity represents a resistance of determined value. The currents passing through said two capacities have the same intensity and consequently neutralise each other in $S_1$ and $S_2$ so that there only remains the current flowing through said parallel resistance.

Jointly with a switch 1 the switch 2 is actuated by a relay 4. The circuit of this relay comprises a resistance $R_8$ while in parallel with the terminals of the relay is connected a condenser $C_1$ in series with a small resistance $R_7$. When the switch 1 is open, the condenser $C_1$ is comparatively slowly charged through $R_7$ and $R_8$ until the voltage across the terminals of $C_1$ has reached so high a value that the relay attracts its armature. Now the contact 1 is closed while $C_1$ has the opportunity of discharging comparatively rapidly through the small resistance $R_7$ whereupon the relay again releases its armature and the process starts anew. It follows, therefore, that the time intervals during which the relay is energised and de-energised materially differ in length according to the difference in duration between dashes and dots.

Figure 2 represents a reading device whose terminals $K_3$ and $K_4$ may be connected respectively to the output terminals $K_1$ and $K_2$ of the receiving apparatus shown in Fig. 1 through the medium of a radio receiver. The primary winding of a transformer T is consequently traversed by audio-frequency currents having a duration equal to that of dashes or dots. The currents induced in the secondary of the transformer T are rectified by the rectifier 5 and impressed across the capacitor 6 and resistor 7 as voltage variations for controlling the grid of the tube $V_1$ which acts as a direct-current amplifier. The signal response of the tube $V_1$ is influenced by a certain degree of filter action which may be attributed to the shunt capacitor 8, shunt resistors 9 and 10 and shunt capacitor 11. The control grid of the tube $V_1$ is made self-biasing by virtue of the combined resistance of the elements 7, 10 and 12, the resistor 12 being shunted by the capacitor 13.

In the anode circuit of this tube are produced current variations as is indicated in Fig. 3, graphs $a$ and $c$ for the case of dashes and dots respectively. Across the secondary winding of a transformer $T_2$ they set up voltage impulses as is diagrammatically shown in Fig. 3, graphs $b$ and $d$.

The impulse combinations for dashes and dots consequently differ in that their initial impulses have opposite signs.

These impulse combinations are supplied to two push-pull connected tubes $V_2$ and $V_3$ which have a circuit-arrangement such that only the first impulse of each combination is passed, as described below.

Between the anodes of these two tubes is located a potentiometer ACB whose sliding contact is connected to the positive terminal of the anode battery, an indicating instrument M being connected in parallel with said potentiometer. When the two grids of $V_2$ and $V_3$ have the same potential, such will also be the case with the points A and B and the pointer of the indicating device M will consequently occupy the zero position. As soon, however, as an impulse is transmitted by $T_2$ the grid of one of the tubes, e. g., $V_2$, becomes more positive and the other more negative. The adjustment of the tubes is so close to the point of cutting-off that the increase of the anode current of $V_2$ surpasses the decrease of the anode current of $V_3$ with the result that the total anode current increases. On its way to the cathodes this current passes through a resistance $R_9$ across which consequently a potential difference is set up. In parallel with $R_9$ is connected a rectifier G in series with a condenser $C_2$ which is rapidly charged via this rectifier. Owing to the presence of the rectifier G, the condenser $C_2$ can only discharge through two resistances $R_{10}$ and $R_{11}$ which are connected in series and of which the latter is included in the common branch of the grid circuits of $V_2$ and $V_3$. A condenser $C_3$ is located in parallel with $R_{11}$. This arrangement results in that the potential difference is applied through $C_2$ via $R_{10}$ between the cathodes and the grids of both tubes which are both cut-off in this case. This potential difference slowly disappears again owing to the discharge of the condenser $C_2$ via $R_{10}$ and $R_{11}$.

The condenser $C_3$ temporarily takes over part of the charge with the result that the production of negative grid voltage at the tubes takes place with some delay. The choice of the various magnitudes is in this case such that only the first half-wave of each incoming impulse combination, which half-wave consequently determines the polarity, is passed on. In dependence on this polarity either $V_2$ or $V_3$ becomes operative with the result that either the potential of A or that of B decreases and that consequently the pointer deflects either to the left or to the right.

What I claim is:

1. A system for making visual course indications comprising a radio receiver responsive to interrupted signals, a directional antenna system comprising coupled directional and non-directional antennae for feeding signaling energy to said receiver, means for periodically varying the orientation of said system, means for producing rhythmic dot and dash impulse variations in the energy delivered to said receiver in synchronism with the variations in orientation of said system, means including a time-constant circuit connected to a relay for translating dot-components of the signals into current pulses of one initial polarity and for translating dash-components of the signals into current pulses of opposite initial polarity, a low frequency push-pull stage responsive to the initial portions of said current pulses, means for biasing both sides of said push-pull stage to cut-off during the remainder of said current pulses, thereby rendering the initial portions only of said current pulses effective in the output circuit of said push-pull stage, and an instrument connected to the output circuit of said push-pull stage and operable to visualize said course indications in accordance with the distinguishing characteristics of the received signals.

2. A system for making visual course indications comprising a radio receiver responsive to interrupted signals, a directional and a non-directional antenna for collecting said signals, means coupling said antennae to said radio receiver to provide a directional antenna system, means for periodically varying the orientation of said system, means for producing rhythmic dot and dash impulse variations in the energy delivered to said receiver in synchronism with the variations in orientation of said system, a low frequency push-pull stage fed with energy from said receiver, means for impressing a bias upon both sides of said push-pull stage, said bias being of such value that the initial half only of a single cycle impulse is passed through said stage while the succeeding half of said cycle is quenched, means including an indicator for differentially visualizing the effects of said half cycles as passed through said push-pull stage, and means for translating the effects of dot-components of said signals into single cycle pulses having one initial polarity and for translating the effects of dash-components of said signals into single cycle pulses of opposite polarity.

3. A system in accordance with claim 2 and further characterized in that the last said means comprises a combination of a rectifier, a resistance and a capacitor for introducing a delay action into the bias control circuit of said push-pull stage.

4. A device in accordance with claim 2 and having means associated with said receiver, said means including a time-constant circuit connected to a relay for producing differently polarized single cycle impulses in response to the reception of dot-components and dash-components of said signals respectively.

BALTHAZAR JAN WESSELINK.